No. 786,346. PATENTED APR. 4, 1905.
J. P. CLEAL.
CASH REGISTER.
APPLICATION FILED NOV. 14, 1901.
6 SHEETS—SHEET 1.
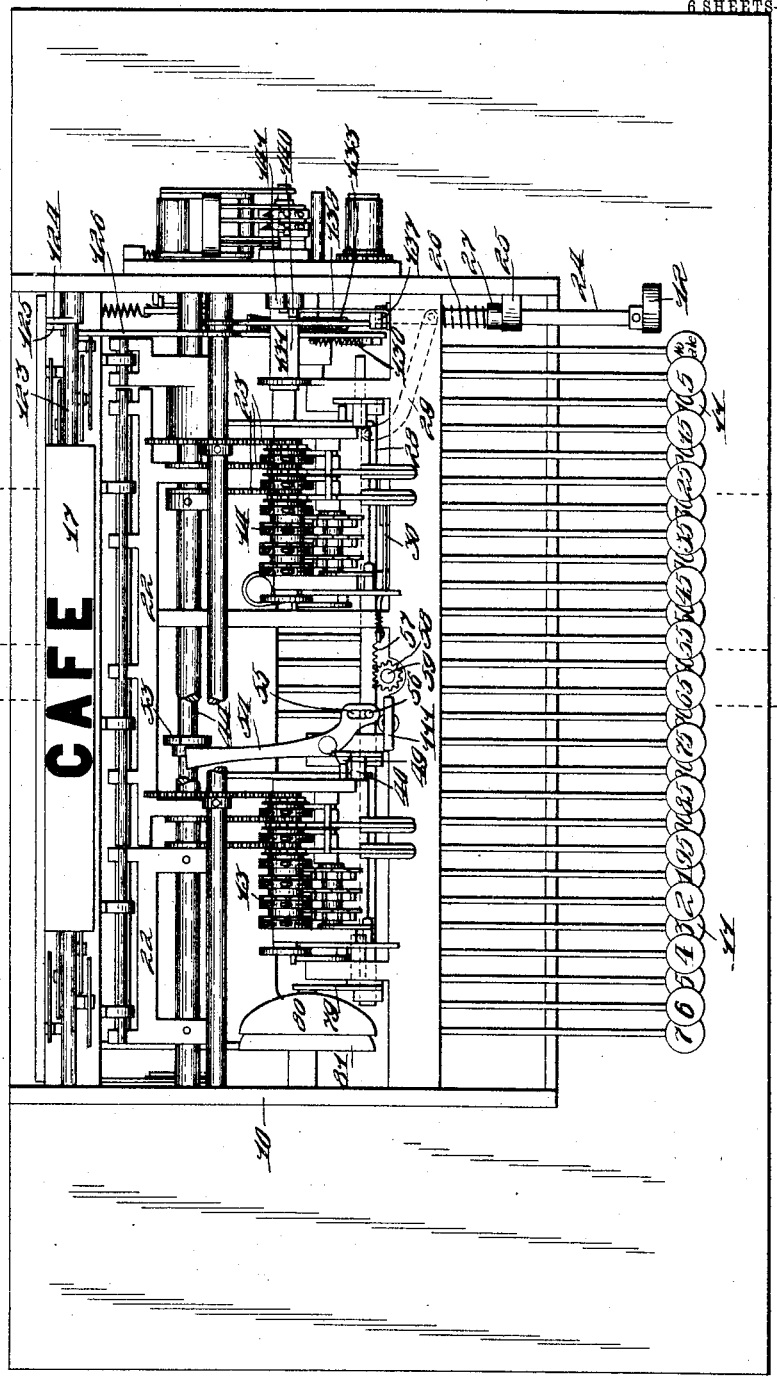
Witnesses
W. McCarthy
Wm E. Mugg
Inventor
Joseph P. Cleal
By Alvan Macauley
Attorney No. 786,346. PATENTED APR. 4, 1905.
J. P. CLEAL.
CASH REGISTER.
APPLICATION FILED NOV. 14, 1901.
6 SHEETS—SHEET 2.
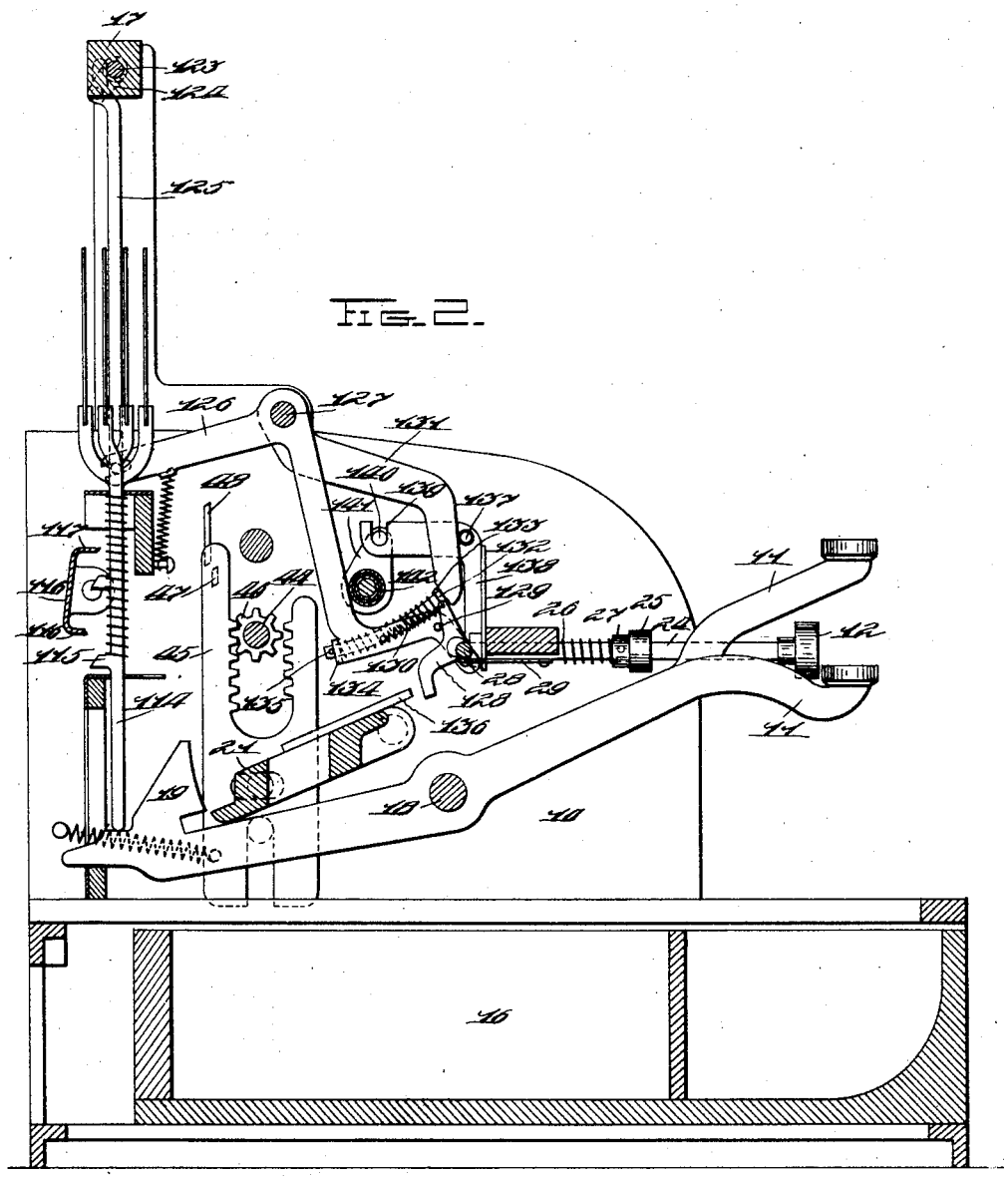
Witnesses
Inventor
Joseph P. Cleal
By Alvan Macauley
Attorney

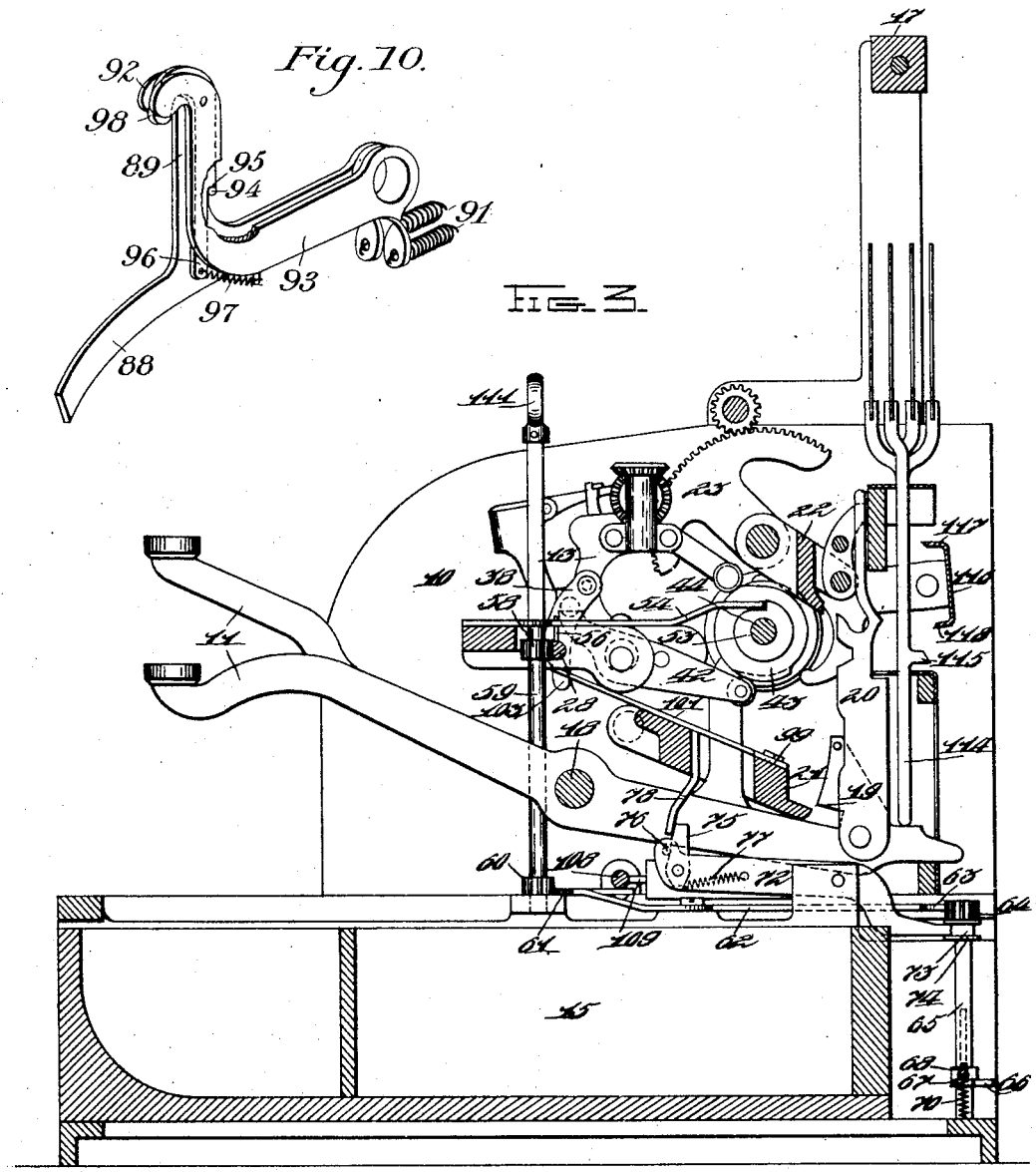

No. 786,346. PATENTED APR. 4, 1905.
J. P. CLEAL.
CASH REGISTER.
APPLICATION FILED NOV. 14, 1901.
6 SHEETS—SHEET 4.
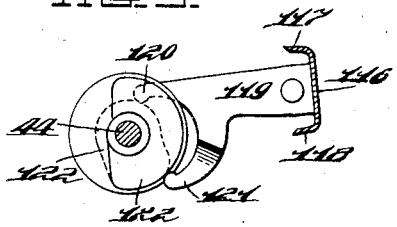
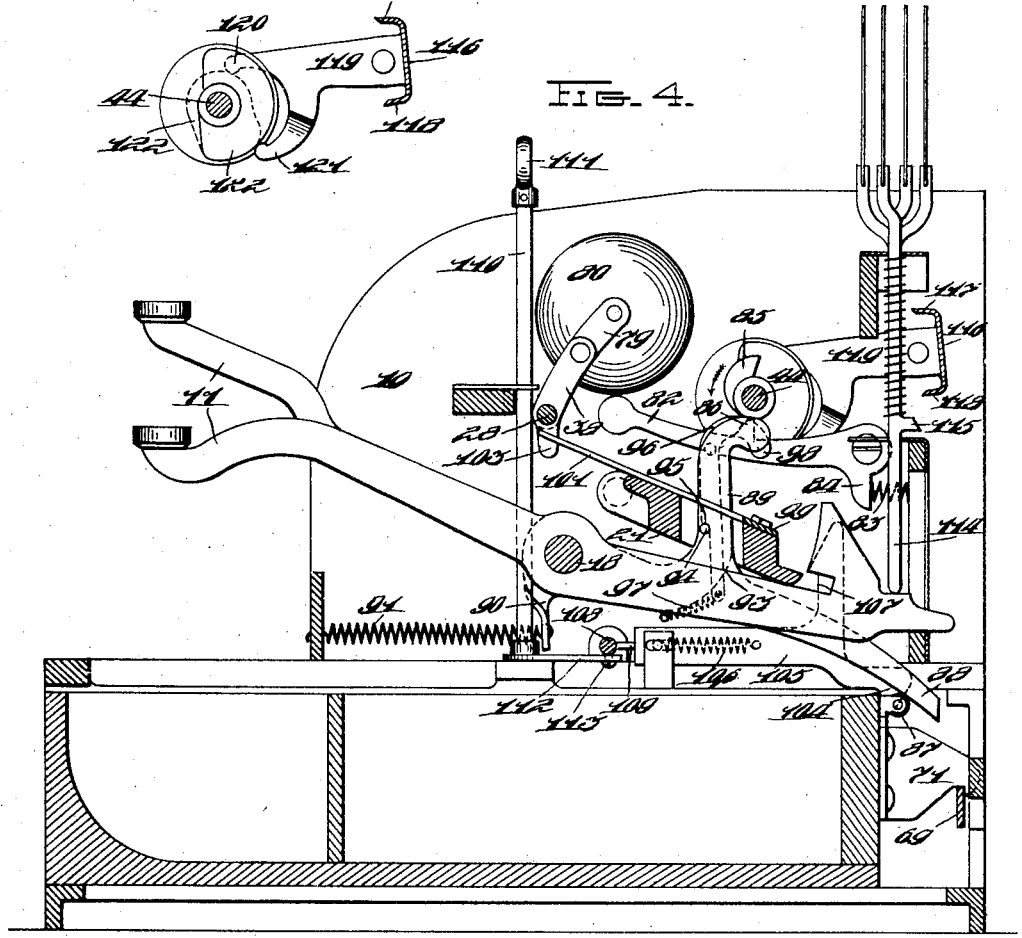
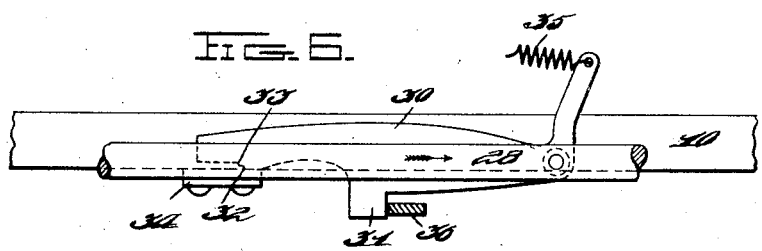

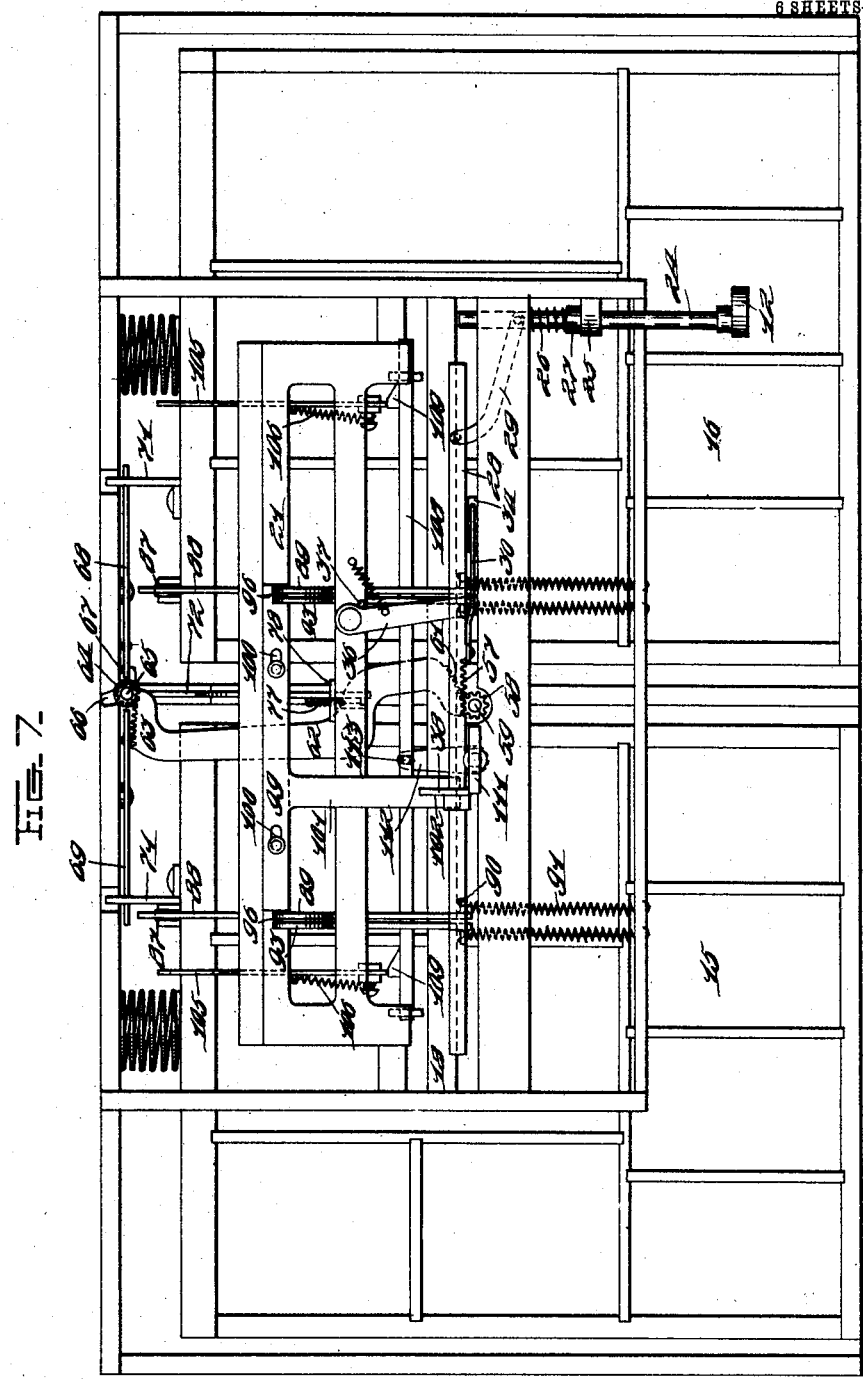

No. 786,346. PATENTED APR. 4, 1905.
J. P. CLEAL.
CASH REGISTER.
APPLICATION FILED NOV. 14, 1901.
6 SHEETS—SHEET 6.
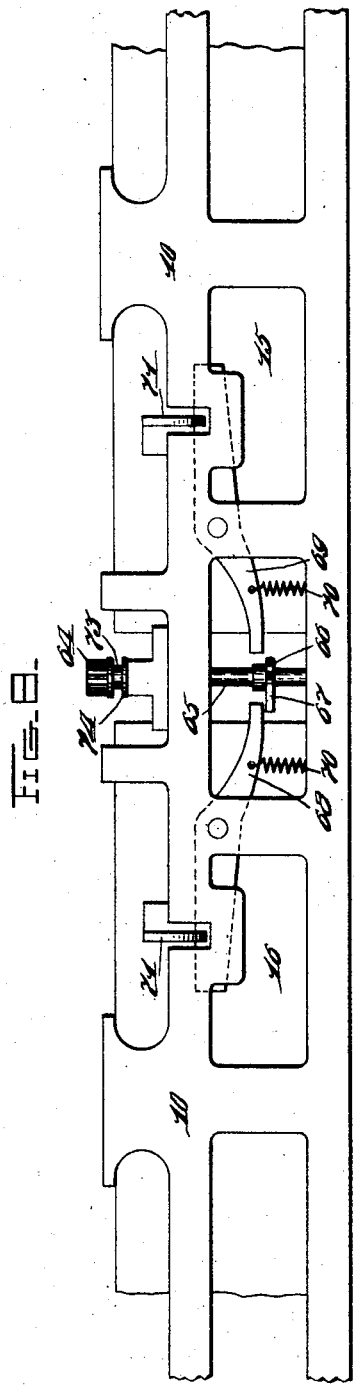
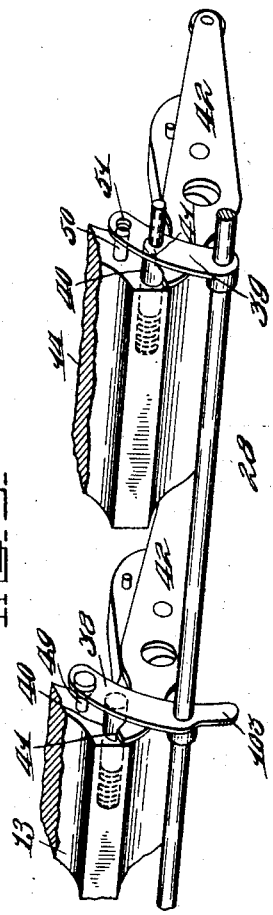
Witnesses
W. McCarthy
N. C. Higgs
Inventor
Joseph P. Cleal
By Alvan Macauley
Attorney No. 786,346. Patented April 4, 1905.

UNITED STATES PATENT OFFICE.

JOSEPH P. CLEAL, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 786,346, dated April 4, 1905.

Application filed November 14, 1901. Serial No. 82,226.

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the type patented by Thomas Carney, No. 536,015, granted March 19, 1895.

The object of the invention is the application to the type of machine above mentioned and also to the type of machine included in my pending application, Serial No. 70,772, of improved drawer and counter controlling devices.

In the accompanying drawings, forming part of this specification, Figure 1 represents a top plan view of a machine of the class included in the aforesaid application with my improvements applied thereto, the cabinet being removed from the same. Fig. 2 represents a vertical transverse section through the same on the line $x$ $x$ of Fig. 1. Fig. 3 represents a similar section on the line $y$ $y$ of Fig. 1. Fig. 4 also represents a similar section on the line $z$ $z$ of Fig. 1. Fig. 5 represents an enlarged detail side elevation, partly in section, of the devices for positively operating the indicator-back rod. Fig. 6 represents an enlarged detail rear elevation of the latching devices for the shifting-rod. Fig. 7 represents a top plan view of the machine with the cabinet removed, parts of the machine being omitted for clearness. Fig. 8 represents a rear elevation of the cash-drawers, drawer-latches, and coöperating parts. Fig. 9 represents an enlarged detail perspective view, partly broken away, of the counter adjusting and throw devices; and Fig. 10 represents an enlarged detail perspective view, partly broken away, of one set of spring-actuated levers for returning the key-coupler to its normal position.

In the aforesaid drawings, 10 represents the frame of the machine, 11 the amount-keys, 12 the special key, 13 and 14 the respective counters, 15 and 16 the cash-drawers, and 17 the special indicator. As a part of the operation of this machine is fully described and illustrated in the aforesaid patent, I will refer to the same for a more detailed description than is hereinafter given. Described generally, however, the key-levers are mounted upon a transverse shaft 18 and are formed at their rear ends with hook projections 19 and a graduated lifting-standard 20, the hook projections 19 coöperating with a pivoted key-coupler 21, while the standards 20 coact with suitable pivoted registering-frames 22. Each of these frames carries a rack-segment 23. In a single-counter machine there is only one of these sets of rack-segments, but in the double-counter machine, as illustrated in the present case, there are two sets of rack-segments, as clearly shown in Fig. 1. These segments are coupled together either by their respective registering-frames or by suitable auxiliary shafts, so as to move in unison to operate either one or the other of the counters 13 and 14, according to the previous adjustment of said counters for operation. This previous adjustment is accomplished by the special push-key 12, which comprises a suitable head or button and a shank 24, the latter being slidably mounted on a lug 25 of the main frame.

A coil-spring 26 surrounds the shank 24 and bears with its opposite ends one against a projection of the main frame and the other against a collar 27, fast to the shank. By these means the special key is normally held in the position shown in Fig. 1. A laterally-shifting rod 28 is mounted in suitable apertured lugs of the main frame and is arranged to be operated by the special key 12 through the medium of a pivoted connecting-link 29. When the key 12 is pushed forward, the rod 28 is shifted to the left, and when the key is subsequently released the rod returns to the right to its normal position. (Shown in Fig. 1.) In order to latch the key in its normal position during the operation of the machine and subsequently releasing it, I provide the shifting-bar 28 with a pivoted latch-lever 30. This lever is formed with a lug 31 and two small shoulders 32 and 33, as plainly shown in Fig. 6. When the rod 28 is in its normal position, the lever 30 rests upon the top of a stationary latch-plate 34, which is secured to the main frame and is held in engagement therewith by coil-spring 35, which connects said lever to a portion of the main frame. When the rod 28 is moved longitudinally by the key 12, the shoulder 32 first passes over the edge of the plate 34, and thus prevents any return of the rod after same is thus partially operated. When the rod is further and fully operated, the shoulder 33 drops opposite the plate 34, and the rod is thus firmly held in its adjusted position until released in the following manner.

A pivoted arm 36 is mounted on the key-coupler 21 and is spring-drawn against a stop-pin 37, also mounted on the coupler, to hold it in its normal position, as shown in Fig. 7. When in this normal position, the forward end of the said arm 36 extends to one side of the lug 31, (see Fig. 6,) so that when the latch-lever 30 is moved to the left with the rod 28 the arm 36 will be turned on its pivot against the tension of its spring by said lug 31. When the key-coupler is subsequently operated, the arm 36 rocks downward at its forward end until free of the lug 31 and then assumes its normal position against the stop 37, with its forward end in a line directly under the lug 31, so that when the key-coupler returns said arm will raise the latch 30 and disengage its shoulder 33 from the plate 34, as shown in Figs. 6 and 7. This operation permits the rod 28 to return to its normal position through the influence of the coil-spring 26, which returns the special key connected to said rod.

From the above it will be seen that the rod 28 may be shifted laterally and latched in its shifted position and thereafter automatically released and allowed to return to its normal position by the regular operation of the machine. The shifting of this rod 28 controls both the counters 13 and 14, as well as the latching devices for the cash-drawers 15 and 16.

The counters 13 and 14 are controlled by the devices which are more clearly illustrated in Fig. 9, and referring to this figure it will be found that the rod 28 carries two rigid arms 38 and 39, which are arranged to respectively control counters 13 and 14. Each of the counter-frames is provided with a spring-pressed plunger 40, formed with a notch 41 in its projecting end, the relative locations of these notches being such that when one of the same is in alinement with a pivoted throwing-lever 42, mounted upon its respective frame, the other will be out of alinement with a similar lever mounted upon the frame of its respective counter. The levers 42 are operated upon each operation of the machine by suitable cams 43, mounted upon a rotation-shaft 44, which receives movement from the key-coupler in the manner well known in the art and illustrated in Fig. 2. This means comprises a reciprocating rack-plate 45, which moves with the coupler through the medium of a slot-and-pin connection. This plate is formed with oppositely-facing racks which alternately engage the pinion and with a projection 47, which is arranged to ride upon opposite sides of a stationary flange 48, and thus hold the respective racks to mesh with the pinion 46. As each of the levers 42 is operated upon each operation of the machine, it will be readily seen that either one or the other of the frames of the counters 13 and 14 will be thrown forward or not, according to the position of the notched plunger 40 of the same. The rearward movement of the counter-frame brings the counter-pinions into mesh with the segmental racks 23. The plungers 40 are operated by the arms 38 and 39. The arm 38 is formed with an elongated slot into which the head of a pin 49 projects, and thus locks the counter-frame. When the arm 38 is moved and the slot thus moved out of alinement with the head of the pin, the counter-frame is free to be rocked. A pin 50 is mounted on the frame of the counter 14 and coöperates with an aperture 51, formed in the frame 39 to lock this frame in a similar manner.

The above-described parts covered by the aforesaid pending application are not claimed in the present case, but are simply given a general description, so that the operation of the machine may be fully understood.

In order to prevent any possibility of the machine being operated when the key 12 is only partially pressed inward, I provide the rotation-shaft 44 with a locking-cam 53. A lever 54, pivoted on the main frame, is formed with an elongated slot 55, which receives a pin 56, mounted on the rod 28. It will be seen by reference to Fig. 1 that as the key 12 is pressed inward and the rod 28 moved to the left the lever 54 will be rocked to bring its rear end into alinement with the locking-shoulder of the cam 53, and thus lock the machine until the key is fully depressed, when the aforesaid end of the lever 54 will pass clear to the right of the cam. As has been stated, the shifting movements of the rod 28 are used to set or control the drawer-releasing means, whereby one of the drawers corresponding to the counter operated may be unlatched. To accomplish this result, the rod 28 is formed with a rack 57, as best shown in Figs. 1 and 7. This rack meshes with a pinion 58, fast to the upper end of a shaft 59, which is suitably journaled in the main frame and is provided at its lower end with a similar pinion 60. (See Fig. 3.) This pinion in turn meshes with a segmental rack 61, formed on the pivoted lever 62, which, as best shown in Fig. 7, is provided at its rear end with a similar segmental rack 63. This rack meshes with a pinion 64, mounted upon a short vertical shaft 65, which is journaled in the main frame, as best shown in Fig. 8. This shaft carries two latch-tripping lugs 66 and 67, arranged substantially at right angles to each other, so that when one of the same is in operative relation with one of two pivoted latches 68 and 69 the other will be out of coöperative relation with its respective latch. This construction is best shown in Fig. 7. From the above it will be seen that when the rod 28 is shifted the shaft 65 will rotate and when so rotated will move the lug 67 from under the latch 68 and at the same time move the lug 66 under the latch 69.

The latch-levers are normally held in the position shown in Fig. 8 by coil-springs 70, which connect them with the main frame. The outer ends of the latches, as best shown in Fig. 4, coöperate with hook-plates 71, fast to the rear walls of the respective cash-drawers, to normally hold the drawers in their closed positions. When the machine is operated, however, the shaft 65 is moved vertically, and thus operates either one or the other of the latches and releases its respective cash-drawer. The vertical movement is imparted to the shaft 65 by a pivoted lever 72, mounted upon the main frame in such a manner that its rear end projects into an annular groove 73, formed in a collar 74, which is fast on the shaft 65. The forward end of the lever 72 is provided with a pivoted pawl 75, which is normally drawn against a stop-pin 76, mounted on the lever by a coil-spring 77, which connects said pawl to the lever. A pendent arm 78, mounted on the key-coupler, normally lies in front of the pawl 75, but when the key-coupler is elevated this arm rocks the pawl 75 rearward until it passes above the same, when the pawl resumes its normal position. Upon the return of the key-coupler the arm 78 engages the top of the pawl 75, and thus operates the lever 72 until the end of the arm slips by the pawl 75 into its normal position. The opening movement of the cash-drawer which has been previously selected is thus controlled by the key-coupler, which is operated by the cash-keys.

The rod 28 in addition to controlling both the two counters and the two drawers also governs the alarm mechanism, which gives a distinctive alarm for each counter or drawer operated. This mechanism comprises a rigid arm 79, mounted on the end of the rod 28 and carrying two bells 80 and 81, which are of different tones and suitably separated and spaced, so that they may be independently sounded. The bell 81 normally lies in the path of a pivoted bell-clapper 82, which is mounted upon the main frame and arranged to be forced into contact with the bell by coil-spring 83, interposed between the nose 84, formed thereon, and the main frame. A cam 85, mounted on the rotation-shaft, is adapted to contact with a nose 86, formed on the lever 82, and thus depress and release same and sound the bell, which is in alinement with the clapper. When the bar 28 is moved to the left by the operation of the key 12, the bell 81 is moved out of alinement with the clapper 82, and the bell 80 is moved into such alinement. By these means it may be ascertained which counter or drawer is being operated by some one at a distance from the register and not close enough to observe the special indicators hereinafter described.

In machines of the class shown in the present instance it is necessary to provide spring means for the return of both the key-coupler and keys to normal position after they have been operated; but it is desirable to remove the load of putting these springs under tension from the keys and place it upon the cash-drawers. To accomplish this result, each of the cash-drawers is provided upon its rear wall with a suitably-mounted antifriction-roller 87. This roller engages a rearwardly-projecting arm 88 on a lever 89, which is pivoted upon the shaft 18 and is formed with a pendent arm 90, to which one end of a coil-spring 91 is connected, the opposite end of said spring being connected to the main frame. It will be seen from the above that when a cash-drawer is opened spring 91 will operate the lever 89, so that its hooked upper end 92 will contact with the top of the key-coupler and draw the same, together with the keys, back to its normal position. When the cash-drawer is again closed, the lever 89 will be returned to its normal position, (shown in Fig. 4,) so that when the key-coupler is subsequently elevated the operation of the key-coupler will not be retarded by being compelled to put the spring 91 under tension. In order to prevent any possibility of the key-coupler remaining in its upper position by holding the cash-drawer closed, and thus not allowing the lever 89 to operate, I provide an auxiliary lever 93, similar to the lever 89, except that it is not provided with a rearwardly-projecting arm 88. This second lever while it is elevated by the closing of the cash-drawer is arranged to descend and operate the key-coupler independently of the movement of the drawer. To accomplish this result, the lever 89 is provided with a laterally-projecting pin 94, which coöperates with a shoulder 95, formed on a pivoted latch-lever 96, which is mounted on the lever 93 and is normally drawn against the pin 94 by a coil-spring 97, which connects it to its lever. The upper end of this latch 96 is formed with a hook nose 98, which projects below the hook noses of levers 89 and 93, so that it will be engaged by a plate 99, mounted on the coupler, and thus tripped. (See Figs. 7 and 10.) The tripping of the latch-lever permits the lever 93 to descend without the lever 89, and thus return the key-coupler and keys to their normal positions.

The plate 99 is slidably mounted on the key-coupler by suitable slot-and-pin connection 100, so that it may be adjusted to coöperate with either one or the other of the latches 96, but not with both of the same at the same time. By this means the lever 93 of the drawer that is not to be opened will not be released and will be held up in position by its companion lever 89. The plate 99 normally lies in the position shown in Fig. 7 and coöperates with the latch 96, pertaining to the right-hand drawer. When the rod 28 is shifted to the left, the plate 99 moves therewith and is thereby moved out of the path of the right-hand latch 96 and into coöperation with the similar left-hand latch. This movement is accomplished through the medium of an arm 101, which projects forward from the plate 99 and is slotted at its forward end at 102 to receive the projecting arm 103, which forms part of the arm 38.

Each of the cash-drawers when closed engages a nose 104, formed on a slide 105, which is suitably mounted on the main frame and forces the same rearward against the tension of a spring 106, which connects said slide to the frame to normally draw it forward, with a hook projection 107, formed thereon, in the path of the key-coupler to prevent any operation of said coupler as long as the drawer remains open. As it is desirable at times, however, to so adjust the parts that one or the other of the cash-drawers may be left open during successive operations of the machine, I provide means for permanently holding the slides 105 in their rearmost and inoperative positions. This means comprises a sliding rod 108, suitably mounted on the main frame and provided with cam projections 109, which when the rod is moved longitudinally engage the slides and force them rearward into inoperative position. The longitudinal movement of the rod 108 is effected by a vertical shaft 110, provided at its upper end with a thumbnut 111 and at its lower end with a slotted crank-arm 112, which receives a pin 113, mounted on the aforesaid rod. By these means the slides 105 may be adjusted into inoperative positions, if so desired, at will.

The rear ends of the key-levers coöperate with indicator-rods 114 to raise the indicators to exposed positions when the keys are operated. Each of the rods 114 is provided with a nose 115, which is arranged to coöperate with a pivoted back rod 116, formed with two flanges 117 and 118. The flange 117 is intended to arrest and hold the indicator-noses 115 after the indicator has been elevated, while the flange 118 is adapted to prevent the jumping of the indicator to its exposed position. One end of the back rod 116 is provided with an operating-arm 119, which is formed at its forward end with two arms 120 and 121. These arms coöperate with cams 122, mounted on the rotation-shaft, whereby the indicator back rod is positively operated or locked. As this feature, however, forms the subject-matter of a pending application, no further description of the same is deemed necessary here.

It has already been described how the special key 12 controls the two counters, the two cash-drawers, and the two alarm devices, and I will now describe how this key also governs the special movements of the special indicator 17. This indicator 17 is preferably rectangular in form and is provided on opposite sides with corresponding indicating characters arranged to be brought into view with the front and rear of the machine. This indicator is mounted on a rocking shaft 123, which is provided with a crank-arm 124. This arm is pivotally connected to a vertical rod 125, which is mounted and constructed in a similar manner to the regular indicator-rods, so that when elevated it will be latched in its elevated position and so held until the back rod is rocked to release both it and the regular indicator. The said bar 125 is elevated to rock the indicator by a pivoted bell-crank lever 126, which is mounted upon a transverse shaft 127 and is connected to said bar by a slot-and-pin connection. The lower forward end of the lever 126 is of angular form, as best shown in Fig. 2, and is provided with a pivoted bell-crank pawl 128. This pawl is normally drawn into the position shown in the aforesaid figure and against a stop-pin 129 by a coil-spring 130, which connects said pawl to the lever. An angular lever 131 is also fulcrumed upon the shaft 127 and is provided at its lower end with a curved rod 132, on which is mounted a coil-spring 133. The rod 132 passes through an apertured lug 134, formed on the lever 126, and is prevented from disengaging therefrom by pin 135, passed through said rod. By means of this construction coil-spring 133 is brought between the arm 131 and lug 134, so that when the arm is operated the spring will be compressed. When the spring is thus put under tension, the pawl 128 engages a rigid arm 136, mounted on the key-coupler and which forms a stop to prevent the operation of the lever 126 until the key-coupler is subsequently operated to move the arm 136 out of the path of the pawl. The operation of the arm 131 is effected by an antifriction-roller 137, mounted on an angular extension 138 of the special-key shank. This angular extension besides operating the lever 131 is also arranged to set a special printing-segment to print a character corresponding to that appearing on the indicator. To accomplish this result, the arm is formed with a notch 139, which receives a pin 140, projecting from a short arm 141, which is fast to a sleeve 142, carrying a suitable printing-segment.

It will be observed from the above description that while the operation of the special key sets the special indicator devices for operation the latter are not operated to change the indication until after the amount-keys have been operated to elevate the coupler and move the arm 136 out of the path of the pawl 128. Upon a return of the lever 126 the pawl 128 upon engaging the arm 136 is simply rocked upon its fulcrum until it passes clear of said arm, when it again assumes its normal position. (Shown in Fig. 2.) If so desired, the special key may be provided with suitable locks whereby it may be locked in one or the other of its adjusted positions; but as this construction forms a part of a copending application it has not been included in the present case.

The expression "operating mechanism" used in the claims means any operating mechanism of a cash-register, whether it be for operating counting devices, printing devices, indicating devices, drawer devices, or any other elements of a cash-register which are usually dependent upon the operation of a main actuator or element. This operating mechanism may be operated directly by the keys, or it may be simply controlled by the keys and receive its movement from an independent source.

Having thus described my invention, what I claim as new, and desire to secure by Letters Patent, is—

1. In a cash-register, the combination with an operating mechanism of a series of cash-receptacles, a series of locking devices coöperating with the respective receptacles and arranged to lock the operating mechanism when any one of the receptacles is opened and means for simultaneously rendering all of the locking means inoperative in connection with the cash-receptacles.

2. In a cash-register, the combination with an operating mechanism of a series of counters, a series of cash-drawers, a shifting-rod for adjusting the counters to operative conditions, latches for the cash-drawers, a rocking device arranged to be brought into coöperation with either one or the other of the latches and gearing connecting said rocking device to the shifting-rod.

3. In a cash-register, the combination with an operating mechanism of a series of cash-receptacles, independent spring devices for the respective receptacles arranged to be put under tension by the movements of said receptacles, means mounted on the spring devices for allowing them to act independently of the receptacles and shifting devices for controlling these means according to the receptacle to be operated.

4. In a cash-register, the combination with an operating mechanism, of a series of cash-drawers, spring devices for setting the operating mechanism arranged to be put under tension by the cash-drawers and including latching devices which are actuated by the operating mechanism to permit the spring devices to move without the cash-drawers, and a shifting device for rendering the latching means operative or inoperative at will.

5. In a cash-register, the combination with an operating mechanism, of a series of drawers, a series of spring devices arranged to be put under tension by their respective drawers and any one of which may independently operate to assist the operating mechanism, a second series of spring devices connected with the first-mentioned series of spring devices and arranged to expend their power irrespective of the movement of their respective drawers, and means for predetermining which of said second series of spring devices shall be operated.

6. In a cash-register, the combination with an operating mechanism including a series of keys and a common key member, of a series of cash-drawers, a series of spring devices arranged to assist the operation of the common key member and put under tension by the movements of the respective drawers, with coöperating provisions such that the spring devices may assist the common key member independently of the movements of the cash-drawers and a shifting mechanism for controlling this independent movement.

7. In a cash-register, the combination with an operating mechanism of a plurality of counters, a plurality of cash-drawers and a plurality of alarms, an indicator device to show which counter is operated, and a single shifting device arranged to control all of the above-mentioned devices.

8. In a cash-register, the combination with an operating mechanism of two cash-drawers, pivoted latches for said drawers, a rotary and vertically-movable member carrying projections for operating the respective latches a pivoted lever formed with racks for rotating said member, means for moving said member vertically and a reciprocating rod and key connections for operating the rack-lever.

9. In a cash-register, the combination with an operating mechanism comprising a series of keys and a common key member, of a series of counters, a key for setting said counters for operation, a special indicator and spring devices for moving said indicator arranged to be put under tension by a special key and to subsequently be released and allowed to operate by the common key member.

10. In a cash-register, the combination with an operating mechanism, including a series of keys and a common key member, a series of counters, a special key for adjusting said counters, a special indicator, a lever for operating said indicator and arranged to be normally restrained by the common key member, but released from the same when it is operated by the keys, a second lever arranged to be operated by the special key and a spring interposed between the levers.

11. In a cash-register, the combination with an operating mechanism, of a special key, an indicator, a pivoted lever for operating said indicator, a second pivoted lever arranged to be operated by a special key, a spring interposed between the levers and means connected to the operating mechanism and normally restraining the first-mentioned lever, but allowing the same to operate after the first movement of the machine.

12. In a cash-register, the combination with an operating mechanism, of a series of counters, a shifting device for adjusting said counters, a single bell-clapper connected to the operating mechanism, and a plurality of bells connected to the shifting device and arranged to be brought individually into coöperation with the clapper, according to the position of said shifting device.

13. In a cash-register, the combination with an operating mechanism, of a plurality of counters, a shifting-rod for adjusting said counters, a slidable key, and a pivoted link connecting said key and rod.

14. In a cash-register, the combination with an operating mechanism, of a plurality of cash-drawers, latches for said drawers, latch-release devices, means for setting said devices, a series of alarms connected to said setting means, and an alarm-sounding device with which any one of the aforesaid alarms may coöperate.

15. In a cash-register, the combination with an operating mechanism including a series of keys and a common member and a series of cash-drawers, hooked slides engaging said drawers and arranged to be normaly held thereby out of engagement with the common key member, but allowed to pass into engagement therewith upon the opening of the drawers and means for simultaneously moving said slides out of the path of the common key member independently of the movements of the drawers.

16. In a cash-drawer, the combination with an operating mechanism including a series of keys and a common key member, of a series cash-drawers, spring-drawn hook-slides, normally held out of engagement with the common key member by the cash-drawers, but allowed to pass into engagement therewith when said drawers are opened, and a slide carrying cam projections arranged to move the hook-slides out of operative position independently of the movements of the drawers.

17. In a cash-register, the combination with an operating mechanism, including a series of keys and a common key member, of a series cash-drawers, a series of spring devices coöperating with the respective drawers, and a common key member and a shifting device mounted on the common key member and arranged to be adjusted to coöperate with one or the other of the spring devices as desired.

18. In a cash-register, the combination with an operating mechanism, of a series of cash-receptacles, independent spring devices coöperating with the respective receptacles and with the operating mechanism to impart movement to the latter by the movement of the spring devices, and means for shifting the coöperative relation between said spring devices and the operating mechanism.

19. In a cash-register, the combination with a series of drawers, latches for said drawers, a rotary and vertically-movable member carrying projections for operating the respective latches, a series of operating-keys, a reciprocating member common to and operated by said keys, and means controlled by said reciprocating member to elevate said movable member.

20. In a cash-register the combination with an operating mechanism, a special key, a special indicator, a spring for setting said indicator put under tension by the movement of the key, a latch for securing the indicator against movement by the spring, and means controlled by the operating mechanism for tripping the latch.

21. In a cash-register the combination with an operating mechanism, of a series of cash-drawers, independent spring devices coöperating with the cash-drawers and with an operating mechanism, and an adjustable device for rendering either one or the other of the spring devices operative independently of the movement of its respective cash-drawer.

In testimony whereof I affix my signature in the presence of two witnesses.

JOSEPH P. CLEAL.

Witnesses:
JOHN A. WERNER,
WM. H. MUZZY.